United States Patent
Sato et al.

(10) Patent No.: US 8,183,336 B2
(45) Date of Patent: May 22, 2012

(54) POLY (ARYLENE SULFIDE)

(75) Inventors: Hiroyuki Sato, Fukushima (JP); Koichi Suzuki, Fukushima (JP); Hirohito Kawama, Tokyo (JP)

(73) Assignee: Kureha Corporation, Tokyo (JP)

( * ) Notice: Subject to any disclaimer, the term of this patent is extended or adjusted under 35 U.S.C. 154(b) by 0 days.

(21) Appl. No.: 12/789,705

(22) Filed: May 28, 2010

(65) Prior Publication Data

US 2010/0234559 A1 Sep. 16, 2010

Related U.S. Application Data

(62) Division of application No. 10/584,629, filed as application No. PCT/JP2004/019476 on Dec. 20, 2004, now Pat. No. 7,754,848.

(30) Foreign Application Priority Data

Dec. 26, 2003 (JP) ................................. 2003-435462

(51) Int. Cl.
C08F 6/10 (2006.01)
C08F 6/12 (2006.01)
C08J 3/12 (2006.01)
C08J 3/14 (2006.01)
C08G 75/10 (2006.01)
C08G 75/14 (2006.01)
C08G 75/16 (2006.01)
C08L 81/00 (2006.01)

(52) U.S. Cl. ........ 528/379; 528/381; 528/388; 528/488; 528/489; 528/492; 528/493; 528/495; 528/499; 528/501; 528/503

(58) Field of Classification Search .................. 528/379, 528/381, 388, 488, 489, 492, 493, 495, 499, 528/501, 503
See application file for complete search history.

(56) References Cited

U.S. PATENT DOCUMENTS

| 4,767,841 | A | 8/1988 | Goetz et al. |
| 4,786,711 | A | 11/1988 | Senatore et al. |
| 5,744,576 | A | 4/1998 | Miyahara et al. |
| 2003/0027943 | A1 | 2/2003 | Bando |
| 2006/0074219 | A1 | 4/2006 | Kawama et al. |

FOREIGN PATENT DOCUMENTS

| EP | 0 278 276 A1 | 8/1988 |
| EP | 0-280-274 A2 | 8/1988 |
| EP | 0-648-797 A2 | 4/1995 |
| EP | 0-720-998 A2 | 7/1996 |
| EP | 1 277 784 A1 | 3/2001 |
| EP | 1 550 685 A1 | 2/2003 |
| EP | 0-586-601 A1 | 10/2005 |
| EP | 1 586 601 A1 | 10/2005 |
| JP | 61-228023 | 10/1986 |
| JP | 62-185718 | 8/1987 |
| JP | 62-220522 | 9/1987 |
| JP | 02-160834 | 6/1990 |
| JP | 02-302436 | 12/1990 |
| JP | 04-139215 | 5/1992 |
| JP | 05-271414 | 10/1993 |
| JP | 6-51792 | 6/1994 |
| JP | 6-51793 | 6/1994 |
| JP | 07-118389 | 5/1995 |
| JP | 08-183858 | 7/1996 |
| JP | 10-265575 | 10/1998 |
| JP | 2000-136246 | 5/2000 |
| JP | 2000-191785 | 7/2000 |
| JP | 2000-273175 | 10/2000 |
| JP | 2001-181394 | 7/2001 |
| JP | 2003-292623 | 10/2003 |
| JP | 2004-217895 | 8/2004 |
| JP | 2004-244619 | 9/2004 |

OTHER PUBLICATIONS

International Search Report.
Chinese Patent Office Office Action dated Aug. 1, 2008, in Chinese with partial English translation.

*Primary Examiner* — Duc Truong
(74) *Attorney, Agent, or Firm* — Porter Wright Morris & Arthur

(57) ABSTRACT

In a process for producing a poly(arylene sulfide) by polymerizing a sulfur source and a dihalo-aromatic compound in the presence of an alkali metal hydroxide in an organic amide solvent, the production process comprises washing a polymer obtained by the polymerization with a hydrophilic organic solvent containing water in a proportion of 1 to 30% by weight, thereby collecting a purified polymer, the content of nitrogen contained in an extract extracted by a mixed solvent containing 40% by weight of acetonitrile and 60% by weight of water from the purified polymer is at most 50 ppm on the basis of the weight of the polymer, and a poly(arylene sulfide), the content of nitrogen contained in an extract extracted by a mixed solvent containing 40% by weight of acetonitrile and 60% by weight of water from the purified polymer is at most 50 ppm on the basis of the weight of the polymer.

5 Claims, No Drawings

POLY (ARYLENE SULFIDE)

CROSS-REFERENCE TO RELATED APPLICATIONS

This application is a divisional of, and claims the benefit under 35 U.S.C. §120 of the earlier filing date of, U.S. patent application Ser. No. 10/584,629, filed Jun. 26, 2006 now U.S. Pat. No. 7,754,848, which is a §371 national stage application of International Application No. PCT/JP2004/019476, filed Dec. 20, 2004, which claims the benefit under 35 U.S.C. §119 of the earlier filing date of Japanese Patent Application No. 2003-435-462, filed Dec. 26, 2003.

TECHNICAL FIELD

The present invention relates to a poly(arylene sulfide) obtained by subjecting a sulfur source and a dihalo-aromatic compound to a polymerization reaction in the presence of an alkali metal hydroxide in an organic amide solvent and a production process thereof, and particularly to a poly(arylene sulfide), the content of nitrogen contained in an extract (impurities) extracted by a mixed solvent of acetonitrile and water from the poly(arylene sulfide) is reduced to at most 50 ppm on the basis of the polymer, and by which a deposit on a mold or die is markedly reduced upon melt molding or forming, and a production process thereof.

BACKGROUND ART

Poly(arylene sulfides) (hereinafter abbreviated as "PASs") represented by poly(phenylene sulfide) (hereinafter abbreviated as "PPS") are engineering plastics excellent in heat resistance, chemical resistance, flame retardancy, "mechanical strength, electrical properties, dimensional stability and the like. The PASs are commonly used in a wide variety of fields such as electrical and electronic equipments and automotive equipments because they can be formed or molded into various kinds of molded or formed products, films, sheets, fibers, etc. by general melt processing techniques such as extrusion, injection molding and compression molding.

As a typical production process of a PAS, is known a process, in which a sulfur source is reacted with a dihalo-aromatic compound in an organic amide solvent such as N-methyl-2-pyrrolidone (hereinafter abbreviated as "NMP"). As the sulfur source, is mainly used an alkali metal sulfide. There is also known a method of using, as the sulfur source, an alkali metal sulfide formed by reacting an alkali metal hydrosulfide with an alkali metal hydroxide in situ.

The polymerization reaction of the sulfur source with the dihalo-aromatic compound is a desalting polycondensation reaction to produce a great amount of a salt (i.e., an alkali metal halide) such as NaCl after the reaction. There have therefore been proposed methods for removing a salt such as NaCl by washing the PAS obtained by the reaction with a washing liquid such as water, an organic solvent, a mixture of water and an organic solvent or water containing a surfactant (for example, Japanese Patent Publication No. 6-86528, Japanese Patent Publication No. 6-57747, Japanese Patent Application Laid-Open No. 4-139215, Japanese Patent Publication No. 4-55445 and Japanese Patent Application Laid-Open No. 10-265575).

On the other hand, There have been proposed production processes of a poly(arylene sulfide), in which a sulfur source and a dihalo-aromatic compound are polymerized in the presence of an alkali metal hydroxide (for example, Japanese Patent Application Laid-Open No. 2-302436, Japanese Patent Application Laid-Open No. 5-271414, Japanese Patent Publication No. 6-51792, Japanese Patent Application Laid-Open No. 2001-181394, Japanese Patent Application Laid-Open No. 2-160834 and Japanese Patent Publication No. 6-51793). According to these production processes, however, it is difficult to set conditions for stably performing the polymerization reaction. In addition, since a great amount of the alkali metal hydroxide is used in these production processes, it is difficult to inhibit side reactions.

When the sulfur source and the dihalo-aromatic compound are polymerized in the presence of the alkali metal hydroxide in the organic amide solvent, the organic amide solvent such as NMP is reacted with the alkali metal hydroxide by heating to produce a compound containing a nitrogen atom as impurities. For example, when NMP reacts with sodium hydroxide (NaOH), NMP is subjected to ring opening to produce sodium methylaminobutanoate [$(CH_3)NH$—$CH_2$—$CH_2$—$CH_2$—$COONa$]. Sodium methylaminobutanoate reacts with the dihalo-aromatic compound that is a monomer component. For example, sodium methylaminobutanoate reacts with p-dichlorobenzene to produce sodium chlorophenylmethylaminobutanoate.

Such a nitrogen atom-containing compound is difficult to be sufficiently removed even when the PAS is purified in a washing step after the polymerization. For example, even when the PAS obtained in the polymerization step is washed with an organic solvent or water, thereby removing by-products such as NaCl, and the content of a low-molecular weight component extracted by Soxhlet extraction with chloroform is reduced to at most 5% by weight, preferably at most 4% by weight, more preferably at most 3% by weight, the nitrogen atom-containing compound remains as impurities.

As a result, the resulting PAS has involved a problem that when the PAS is injection-molded or extruded, the impurities adhere to a mold or die. Since stain of the mold or die, which is caused by such a nitrogen atom-containing compound, adversely affects the quality of a molded or formed product, the mold or die requires frequent cleaning.

DISCLOSURE OF THE INVENTION

It is an object of the present invention to provide a poly (arylene sulfide) which is obtained by subjecting a sulfur source and a dihalo-aromatic compound to a polymerization reaction in the presence of an alkali metal hydroxide in an organic amide solvent, and markedly reduced in the content of impurities composed of a nitrogen atom-containing compound, and a production process thereof.

The present inventors have carried out an extensive investigation with a view toward achieving the above object. As a result, it has been found that in a production process of a PAS by polymerizing a sulfur source and a dihalo-aromatic compound in the presence of an alkali metal hydroxide in an organic amide solvent, the content of impurities composed of a nitrogen atom-containing compound produced by the cause of decomposition of the organic amide solvent can be markedly reduced by washing the polymer obtained by the polymerization with a hydrophilic organic solvent (hereinafter referred to as "water-containing organic solvent") containing water in a proportion of 1 to 30% by weight.

The proportion of 1 to 30% by weight of water means a percentage of water to the total weight of the polymer and the mixture (water-containing hydrophilic organic solvent) composed of water and the hydrophilic organic solvent during the washing.

The content of the impurities containing the nitrogen atom can be objectively evaluated by determining an amount of nitrogen contained in an extract extracted from the polymer by a mixed solvent containing 40% by weight of acetonitrile and 60% by weight of water. It has been surprisingly found that the impurities composed of the nitrogen atom-containing compound can be markedly reduced in the case where the PAS formed is washed with the water-containing organic solvent though there is no very great difference in the effect to reduce the content of a low-molecular weight component between the case where the PAS is washed with the water-containing organic solvent and the case where the PAS is washed by singly using the organic solvent or water as a washing liquid.

No particular limitation is imposed on the PAS that is an object of the present invention so far as it is a PAS obtained by polymerizing a sulfur source and a dihalo-aromatic compound in the presence of an alkali metal hydroxide in an organic amide solvent. However, as a polymerization process for stably performing a polymerization reaction to inhibit inconvenient reactions such as thermal decomposition reactions, is preferably adopted a process comprising arranging (1) a dehydration step of heating a mixture with an alkali metal hydroxide contained in a proportion of 0.95 to 1.05 mol per mol of an alkali metal hydrosulfide in an organic amide solvent to dehydrate the mixture, and (2) a charging step of adding an alkali metal hydroxide and water to the mixture remaining in the system after the dehydration step, as needed, in such a manner that 1.00 to 1.09 mol of the alkali metal hydroxide and 0.5 to 2.0 mol of water are present per mol of a sulfur source including the alkali metal hydrosulfide, and performing a polymerization reaction in accordance with a specific two-stage process. Examples of a process for performing the polymerization reaction in accordance with the specific two-stage process include a process disclosed in Japanese Patent Application Laid-Open No. 8-183858.

According to the present invention, there is thus provided a process for producing a poly(arylene sulfide) by polymerizing a sulfur source and a dihalo-aromatic compound in the presence of an alkali metal hydroxide in an organic amide solvent, which comprises washing a polymer obtained by the polymerization with a hydrophilic organic solvent containing water in a proportion of 1 to 30% by weight, thereby collecting a purified polymer, the content of nitrogen contained in an extract extracted by a mixed solvent containing 40% by weight of acetonitrile and 60% by weight of water from the purified polymer is at most 50 ppm on the basis of the weight of the polymer.

The hydrophilic organic solvent used in the washing may preferably be acetone containing water in a proportion of 1 to 20% by weight.

The production process of the poly(arylene sulfide) by polymerizing the sulfur source and the dihalo-aromatic compound in the presence of the alkali metal hydroxide in the organic amide solvent may preferably be a production process comprising the respective steps of:
(1) a dehydration step of heating and reacting a mixture containing an organic amide solvent, an alkali metal hydrosulfide and the alkali metal hydroxide in a proportion of 0.95 to 1.05 mol per mol of the alkali metal hydrosulfide to discharge at least a part of a distillate containing water from the interior of the system containing the mixture to the exterior of the system,
(2) a charging step of adding an alkali metal hydroxide and water to the mixture remaining in the system after the dehydration step, as needed, in such a manner that 1.00 to 1.09 mol of the alkali metal hydroxide and 0.5 to 2.0 mol of water are present per mol of a sulfur source (hereinafter referred to as "charged sulfur source") including the alkali metal hydrosulfide, and
(3) a first-stage polymerization step of adding the dihalo-aromatic compound to the mixture to subject the sulfur source and the dihalo-aromatic compound to a polymerization reaction at a temperature of 170 to 270° C. in the organic amide solvent, thereby forming a prepolymer that a conversion of the dihalo-aromatic compound is 50 to 98%, and
(4) a second-stage polymerization step of controlling the amount of water in the reaction system after the first-stage polymerization step so as to bring about a state that water exists in a proportion of 2.0 to 10 mol per mol of the charged sulfur source, and heating the reaction system at 245 to 290° C., thereby continuing the polymerization reaction.

According to the present invention, there is also provided a poly(arylene sulfide) obtained by polymerizing a sulfur source and a dihalo-aromatic compound in the presence of an alkali metal hydroxide in an organic amide solvent, wherein the content of nitrogen contained in an extract extracted by a mixed solvent containing 40% by weight of acetonitrile and 60% by weight of water from the polymer is at most 50 ppm on the basis of the weight of the polymer.

BEST MODE FOR CARRYING OUT THE INVENTION

1. Sulfur Source

In the present invention, an alkali metal hydrosulfide is generally used as a sulfur source. As examples of the alkali metal hydrosulfide, may be mentioned lithium hydrosulfide, sodium hydrosulfide, potassium hydrosulfide, rubidium hydrosulfide, cesium hydrosulfide and mixtures of two or more compounds thereof. The alkali metal hydrosulfide may be used in any form of an anhydride, a hydrate and an aqueous solution. Among these, sodium hydrosulfide and lithium hydrosulfide are preferred in that they are industrially available at a low price. The alkali metal hydrosulfide is preferably used as an aqueous mixture (i.e., a mixture with water having fluidity) such as an aqueous solution from the viewpoints of processing operation, metering, etc.

In general, a small amount of an alkali metal sulfide is secondarily produced in a production process of the alkali metal hydrosulfide. A small amount of the alkali metal sulfide may be contained in the alkali metal hydrosulfide used in the present invention. In this case, the total molar quantity of the alkali metal hydrosulfide and alkali metal sulfide becomes a charged sulfur source after a dehydration step.

Examples of the alkali metal hydroxide include lithium hydroxide, sodium hydroxide, potassium hydroxide, rubidium hydroxide, cesium hydroxide and mixtures of two or more compounds thereof. Among these, sodium hydroxide and lithium hydroxide are preferred. The alkali metal hydroxide is preferably used as an aqueous mixture such as an aqueous solution.

In the production process according to the present invention, examples of water to be dehydrated in the dehydration step includes water of hydration, a water medium of an aqueous solution and water secondarily produced in a reaction of the alkali metal hydrosulfide with the alkali metal hydroxide.

2. Dihalo-Aromatic Compound

The dihalo-aromatic compound used in the present invention is a dihalogenated aromatic compound having 2 halogen atoms directly bonded to the aromatic ring. Specific examples of the dihalo-aromatic compound include o-dihalobenzene, m-dihalobenzene, p-dihalobenzene, dihalotoluene, dihalonaphthalene, methoxy-dihalobenzene, dihalodiphenyl, dihalobenzoic acid, dihalodiphenyl ether, dihalodiphenyl sulfone, dihalodiphenyl sulfoxide and dihalodiphenyl ketone.

Here, the halogen atom means each of fluorine, chlorine, bromine and iodine atoms, and 2 halogen atoms in the same dihalo-aromatic compound may be the same or different from each other. These dihalo-aromatic compounds may be used either singly or in any combination thereof.

The charged amount of the dihalo-aromatic compound is generally 0.90 to 1.50 mol, preferably 0.95 to 1.20 mol, more preferably 1.00 to 1.09 mol per mol of the sulfur source (alkali metal sulfide and/or alkali metal hydrosulfide) remaining in the system after the dehydration step.

3. Molecular Weight Modifier, and Branching or Crosslinking Agent

In order to, for example, form a terminal of a specific structure in a PAS formed or modify a polymerization reaction or a molecular weight, a monohalo-compound (may not be always an aromatic compound) may be used in combination. In order to form a branched or crosslinked polymer, for example, a polyhalo-compound (may not be always an aromatic compound), to which at least 3 halogen atoms are bonded, an active hydrogen-containing halogenated aromatic compound, and a halogenated aromatic nitro compound may also be used in combination. Preferable examples of the polyhalo-compound as a branching or crosslinking agent include trihalobenzenes.

4. Organic Amide Solvent

In the present invention, an organic amide solvent that is an aprotic polar organic solvent is used as a solvent for the dehydration reaction and polymerization reaction. The organic amide solvent is preferably stable to an alkali at a high temperature.

Specific examples of the organic amide solvent include amide compounds such as N,N-dimethylformamide and N,N-dimethylacetamide; N-alkylcaprolactam compounds such as N-methyl-s-caprolactam; N-alkylpyrrolidone compounds or N-cycloalkylpyrrolidone compounds such as N-methyl-2-pyrrolidone and N-cyclohexyl-2-pyrrolidone; N,N-dialkyl-imidazolidinone compounds such as 1,3-dialkyl-2-imidazolidinones; tetraalkylurea compounds such as tetramethylurea; and hexaalkylphosphoric triamide compounds such as hexamethylphosphoric triamide. These organic amide solvents may be used either singly or in any combination thereof.

Among these organic amide solvents, N-alkyl-pyrrolidone compounds, N-cycloalkylpyrrolidone compounds, N-alkylcaprolactam compounds and N,N-dialkyl-imidazolidinone compounds are preferred, and N-methyl-2-pyrrolidone, N-methyl-E-caprolactam and 1,3-dialkyl-2-imidazolidinones are particularly preferably used. The amount of the organic amide solvent used in the polymerization reaction in the present invention is generally within a range of 0.1 to 10 kg per mol of the sulfur source.

5. Polymerization Aid

In order to promote the polymerization reaction to obtain a PAS having a high polymerization degree in a short period of time, various kinds of polymerization aids may be used in the present invention as needed. Specific examples of the polymerization aids include metal salts of organic sulfonic acids, lithium halides, metal salts of organic carboxylic acids and alkali metal salts of phosphoric acid, which are generally publicly known as polymerization aids for PASs. Among these, metal salts of organic carboxylic acids are particularly preferred because they are inexpensive. The amount of the polymerization aid used varies according to the kind of the compound used. However, it is generally within a range of 0.01 to 10 mol per mol of the charged sulfur source.

6. Dehydration Step

A dehydration step is arranged as a preliminary step for a polymerization step to control the amount of water in the reaction system. The dehydration step is performed by a process comprising heating a mixture containing the organic amide solvent, the alkali metal hydrosulfide and the alkali metal hydroxide, desirably, under an inert gas atmosphere and discharging water outside the system by distillation.

In the present invention, it is preferred that in the dehydration step, a mixture containing the organic amide solvent, the alkali metal hydrosulfide and the alkali metal hydroxide in a proportion of 0.95 to 1.05 mol per mol of the alkali metal hydrosulfide be heated to cause at least a part of the alkali metal hydrosulfide to react with the alkali metal hydroxide, thereby converting it into an alkali metal sulfide and at the same time, discharge at least a part of a distillate containing water from the interior of the system containing the mixture to the exterior of the system.

If a molar ratio of the alkali metal hydroxide to a mole of the charged alkali metal hydrosulfide in this step is too low, the amount of a sulfur component (hydrogen sulfide) volatilized off in the dehydration step becomes great, which tends to incur reduction in productivity due to lowering of the amount of the charged sulfur source or cause abnormal reactions and deterioration of a PAS formed due to increase of a polysulfide component in the charged sulfur source remaining after the dehydration. If the molar ratio of the alkali metal hydroxide to a mole of the charged alkali metal hydrosulfide is too high, in some cases, change in properties of the organic amide solvent may be increased, difficulty may be encountered on stably performing the polymerization reaction, or the quality of a PAS formed may be deteriorated. A preferable molar ratio of the alkali metal hydroxide to a mole of the charged alkali metal hydrosulfide in this step is 0.96 to 1.04.

In many cases, a small amount of an alkali metal sulfide is contained in an alkali metal hydrosulfide, so that the amount of the sulfur source involves a total of the alkali metal hydrosulfide and the alkali metal sulfide. No problem arises as to a raw material for the PAS even if the alkali metal hydrosulfide contains the alkali metal sulfide. Even when a small amount of the alkali metal sulfide is mixed in, the molar ratio to the alkali metal hydroxide may be calculated out on the basis of the content (analytical value) of the alkali metal hydrosulfide to regulate the molar ratio.

In the dehydration step, the dehydration is conducted until the content of water comprising water of hydration (water of crystallization), a water medium, secondarily produced water, etc. is lowered within a range of necessary amounts. In the dehydration step, the dehydration is preferably conducted until the water content in the polymerization reaction system is reduced to 0.5 to 2.0 mol per mol of the sulfur source. When the water content has become too low in the dehydration step, water may be added prior to the polymerization step to regulate the water content to a desired value.

The charging of these raw materials into a reaction vessel is conducted within a temperature range of generally from ordinary temperature to 300° C., preferably from ordinary temperature to 200° C. The charging of the raw materials may not be in order, and the respective raw materials may be additionally charged in the course of the dehydration process. An organic amide solvent is used as a solvent used in the dehydration step. This solvent is preferably the same as the organic amide solvent used in the polymerization step, and N-methyl-2-pyrrolidone is particularly preferred. The amount of the organic amide solvent used is generally of the order of 0.1 to 10 kg per mol of the sulfur source charged in the reaction vessel.

The dehydration process is conducted by heating the mixture after charging the raw materials into the reaction vessel in a temperature range of generally up to 300° C., preferably 100 to 250° C. for generally 15 minutes to 24 hours, preferably 30 minutes to 10 hours. Heating methods include a method of retaining a fixed temperature, a method of raising the temperature either stepwise or continuously and a method of combining both methods. The dehydration step is conducted by, for example, a batch system, a continuous system or a combined system of both systems.

An apparatus for conducting the dehydration step may be the same as a reaction vessel (reactor) used in the subsequent polymerization step or different from it. A material of the apparatus is preferably a corrosion resistant material such as titanium. In the dehydration step, a part of the organic amide solvent is generally discharged together with water outside the reaction vessel. At that time, hydrogen sulfide is discharged as a gas outside the system.

In the dehydration step, it is considered that the alkali metal hydroxide reacts with the organic amide solvent by the heat treatment to produce an alkali metal alkylaminoalkylcarboxylate, and the alkali metal hydrosulfide exists in the system in the form of a complex with the alkali metal alkylaminoalkylcarboxylate. On the other hand, a part of the alkali metal hydrosulfide reacts with water to produce hydrogen sulfide and an alkali metal hydroxide, and the hydrogen sulfide produced is discharged outside the system. The discharge of hydrogen sulfide outside the system is directly linked with the weight loss of the sulfur source in the system. Accordingly, it is important to measure the amount of hydrogen sulfide volatilized off in the dehydration step to exactly calculate out the amount of the sulfur source remaining in the system in that a molar ratio of the sulfur source to the alkali metal hydroxide or dihalo-aromatic compound is regulated.

7. Charging Step

In the present invention, it is preferred that an alkali metal hydroxide and water be added to the mixture remaining in the system after the dehydration step, as needed, in such a manner that 1.00 to 1.09 mol of the alkali metal hydroxide and 0.5 to 2.0 mol of water are present per mol of the sulfur source (charged sulfur source) including the alkali metal hydrosulfide and alkali metal sulfide. Here, the amount of the charged sulfur source is calculated out in accordance with an equation, [Charged sulfur source]=[Total moles of sulfur charged]−[Moles of sulfur volatilized off after dehydration]. The amount of the charged sulfur source may also be referred to as the amount of "available S". The sulfur source is consumed by the polymerization reaction. When its molar ratio to any other component is calculated, the amount of the sulfur source is based on the amount (amount of available S) of "the charged sulfur source" in the charging step.

When hydrogen sulfide is volatilized off in the dehydration step, an alkali metal hydroxide is produced by an equilibrium reaction and comes to remain in the system. Accordingly, it is necessary to exactly grasp these amounts to determine a molar ratio of the alkali metal hydroxide to the sulfur source in the charging step.

If the molar ratio of the alkali metal hydroxide to a mole of the sulfur source is too high, in some cases, change in properties of the organic amide solvent may be increased, or abnormal reactions or decomposition reactions may be caused upon polymerization. In addition, if this molar ratio is too high, the lowering of the yield and quality of a PAS formed is often caused. The molar ratio of the alkali metal hydroxide to a mole of the sulfur source is preferably 1.01 to 1.08 mol, more preferably 1.015 to 1.075 mol. It is preferred to conduct the polymerization reaction slightly in excess of the alkali metal hydroxide in that the polymerization reaction is stably performed to obtain a high-quality PAS.

8. Polymerization Step

The polymerization step is conducted by charging a dihalo-aromatic compound into the mixture after completion of the dehydration step and heating the sulfur source and the dihalo-aromatic compound in the organic amide solvent. When a different polymerization vessel from the reaction vessel used in the dehydration step is used, the mixture after the dehydration step and the dihalo-aromatic compound are charged into the polymerization vessel. After the dehydration step and before the polymerization step, the amounts of the organic amide solvent and coexisting water may be controlled as needed. Before the polymerization step or during the polymerization step, a polymerization aid and other additives may be mixed.

The mixing of the mixture obtained after completion of the dehydration step with the dihalo-aromatic compound is conducted within a temperature range of generally from 100 to 350° C., preferably from 120 to 330° C. When the respective components are charged into the polymerization vessel, no particular limitation is imposed on the order of charging. Examples of a charging method include a method of partially charging both components in small portions and a method of charging both components at a time.

In general, the polymerization reaction is preferably conducted by a two-stage process at a temperature ranging from 170 to 290° C. As a heating method, is used a method of retaining a fixed temperature, a method of raising the temperature either stepwise or continuously or a combination of both methods. The polymerization reaction time is within a range of generally from 10 minutes to 72 hours, desirably from 30 minutes to 48 hours. The amount of the organic amide solvent used in the polymerization step is within a range of generally from 0.1 to 10 kg, preferably from 0.15 to 1 kg per mol of the charged sulfur source existing in the polymerization step. The amount may be changed in the course of the polymerization reaction so far as it falls within this range.

The water content upon the beginning of the polymerization reaction is preferably controlled within a range of 0.5 to 2.0 mol per mol of the charged sulfur source. It is preferable to increase the water content in the course of the polymerization reaction.

In a preferable production process according to the present invention, the polymerization reaction is conducted in the polymerization step by an at least two-stage polymerization process comprising:

(1) a first-stage polymerization step of heating a reaction mixture containing the organic amide solvent, the sulfur source, the dihalo-aromatic compound and the alkali metal hydroxide of the specified molar ratio at 170 to 270° C. in the presence of water in a proportion of 0.5 to 2.0 mol per mol of the charged sulfur source to conduct a polymerization reaction, thereby forming a prepolymer that a conversion of the dihalo-aromatic compound is 50 to 98%, and (2) a second-stage polymerization step of controlling the amount of water in the reaction system so as to bring about a state that water exists in a proportion of 2.0 to 10 mol per mol of the charged sulfur source, and heating the reaction system at 245 to 290° C., thereby continuing the polymerization reaction.

In the first-stage polymerization step, it is desirable to form a prepolymer having a melt viscosity of 0.5 to 30 Pa·s as measured at a temperature of 310° C. and a shear rate of 1,216 sec$^{-1}$.

Water may be added at a second stage of the polymerization reaction or upon completion thereof to increase the water content for the purpose of lowering the contents of common salt secondarily produced and impurities in the polymer formed or collecting the polymer in the form of particles. The system of the polymerization reaction may be a batch system, a continuous system or a combination of both systems. In the batch-wise polymerization, 2 or more reaction vessels may be used for the purpose of shortening the polymerization cycle time.

9. Post Treatment Step

In the production process according to the present invention, a post treatment after the polymerization reaction may be conducted in accordance with a method known per se in the art except that a step of washing a product with a water-containing organic solvent is arranged. For example, after completion of the polymerization reaction, a product slurry cooled is separated by filtration as it is or after diluted with water or the like, and the resulting filter cake is washed and filtered repeatedly and then dried, whereby a PAS can be collected. According to the preferable production process of the present invention, a granular polymer can be formed, so that the granular polymer is preferably separated from the reaction mixture by a method of sieving the polymer by means of a screen because the polymer can be easily separated from by-products, oligomers, etc. The product slurry may be subjected to sieving as it is in a high-temperature state, thereby collecting the polymer.

The production process according to the present invention comprises the step of washing the formed polymer with a hydrophilic organic solvent containing water in a proportion of 1 to 30% by weight. The hydrophilic organic solvent may be either an aprotic organic solvent or a protic organic solvent. Examples of the aprotic organic solvent include ketones such as acetone; nitriles such as acetonitrile; and organic amides such as N-methyl-2-pyrrolidone and N,N-dimethylformamide. Typical examples of the protic organic solvent include alcohols such as methyl alcohol, ethyl alcohol and propyl alcohol. These hydrophilic organic solvents may be used either singly or in any combination thereof.

Among these hydrophilic organic solvents, acetone is preferred in that it is excellent in the effect to remove impurities composed of the nitrogen atom-containing compound. Acetone is also preferred from the viewpoints of economics and safety. However, the use of acetone (dehydrated acetone) alone is extremely insufficient in the effect to remove the nitrogen atom-containing compound. When water-containing acetone (hydrous acetone) is used as a washing liquid, the content of water is preferably 1 to 20% by weight, more preferably not lower than 2% by weight, but lower than 20% by weight.

If the content of water in the water-containing organic solvent used as the washing liquid is too low, it is difficult to sufficiently remove the impurities composed of the nitrogen atom-containing compound. If the content of water in the water-containing organic solvent used as the washing liquid is too high, the removal efficiency of a low-molecular weight component (component extracted by Soxhlet extraction with chloroform) contained in the PAS may be lowered in some cases.

In the present invention, the polymer is sufficiently washed with such a water-containing organic solvent until the content of nitrogen contained in an extract extracted with the mixed solvent of acetonitrile/water (40% by weight/60% by weight) is at most 50 ppm, preferably at most 40 ppm, more preferably at most 30 ppm, particularly preferably at most 25 ppm on the basis of the weight of the polymer. The lower limit of this nitrogen content is of the order of 1 ppm or 2 ppm.

In addition to the washing with such a water-containing organic solvent, the polymer may also be washed with an organic solvent containing no water, an organic solvent containing a great amount of water, water, hot water and/or the like. The PAS formed may also be subjected to a treatment (washing) with an acid or a treatment with a salt such as ammonium chloride.

10. Poly(Arylene Sulfide)

According to the production process of the present invention, there can be provided a PAS, the content of nitrogen derived from impurities contained in which is at most 50 ppm on the basis of the weight of the polymer as determined in accordance with a measuring method (described in Examples) specified in the description of the present application. If the content of nitrogen derived from the impurities is too high, the amount of a volatile component becomes excessive when such a PAS is injection-molded, so that the resulting molded product tends to cause defects at its appearance, or the amount of impurities adhered to a mold increases to markedly lower workability upon molding and processing. If the content of nitrogen derived from the impurities is too high, a die tends to be contaminated when such a PAS is extruded. Since the PAS according to the present invention is little in the amount of volatile matter generated, it may be suitably applied to fields of electronic equipments and the like, in which inhibition of volatile matter is desired.

The PAS according to the present invention has a melt viscosity of generally 1 to 3,000 Pa's, preferably 3 to 2,000 Pa·s, more preferably 10 to 1,500 Pa·s (as measured at a temperature of 310° C. and a shear rate of 1,216 seq$^{-1}$).

The PAS according to the present invention contains a low-molecular weight component extracted by Soxhlet extraction with chloroform in an amount of generally at most 5.0% by weight, more preferably at most 4.0% by weight, particularly preferably at most 3.0% by weight.

The PAS according to the present invention may be molded or formed into various molded or extruded products by injection molding, extrusion or the like. Among PAS, PPS is particularly preferred.

EFFECTS OF THE INVENTION

According to the present invention, there can be provided the PAS markedly reduced in the content of impurities composed of a nitrogen atom-containing compound formed by the reaction of the organic amide solvent with the alkali metal hydroxide. The PAS according to the present invention is extremely little in stain on a mold or die, which is caused by the nitrogen atom-containing compound, and so it is suitable for use in production of various molded or formed products by injection molding, extrusion or the like.

EXAMPLES

The present invention will hereinafter be described more specifically by the following Examples and Comparative Examples. Measuring methods of physical properties and properties or characteristics are as follows.

(1) Yield:

Assuming that all the available sulfur component existing in a reaction vessel after a dehydration step was converted to a polymer, the weight (theoretical amount) of that polymer was used as a reference value to calculate out a proportion (% by weight) of the weight of a polymer actually collected to the reference value as a yield of the polymer.

(2) Melt Viscosity:

A melt viscosity was measured by using about 20 g of a dry polymer by means of Capirograph 1-C (manufactured by Toyo Seiki Seisakusho, Ltd.). At this time, a flat die of 1 mm in diameter×10 mm in length was used as a capillary, and the temperature was set to 310° C. After the polymer sample was placed in the apparatus and held for 5 minutes, the melt viscosity was measured at a shear rate of 1,216 $sec^{-1}$.

(3) Content of Nitrogen Derived from Impurities in Polymer:

Into a 50-ml messflask are added 2.0 g of a sample and 40 ml of a mixed solvent [acetonitrile:water=40:60 (% by weight)] of acetonitrile and water. An extraction process is conducted for 30 minutes by ultrasonic washing, and the mixed solvent containing an extract was dried to recover the extract. Elemental analysis was conducted on the extract by means of a micro nitrogen-sulfur analyzer (manufactured by ASTECH Corp., Model "ANTEK7000^") to determine a content of nitrogen. The content of nitrogen was indicated as a reduced value to the sample (polymer).

(4) Determination (Soxhlet Extraction) of a Low-Molecular Weight Component:

About 10 g of a polymer was subjected to Soxhlet extraction with 50 ml of chloroform as an extracting solvent. Extraction time was set to 6 hours. After completion of the extraction, the solvent was evaporated by a rotary evaporator, and the residue was vacuum-dried at 60° C. for 2 hours. The weight of the extract remaining in a flask was then measured to calculate out a content of a low-molecular weight component contained in the polymer on the basis of the measured weight and the weight of the polymer used in the extraction.

(5) Gas Generated:

Four grams of a sample and a test piece of SUS were placed in a test tube and heated and held for 3 hours at 280° C. in a dry block bath. After the test tube was then left to stand for 10 hours at room temperature, an amount of pitch adhered to the test piece of SUS was visually observed to make a judgment in accordance with the following standard.

A: Pitch is small,
B: Pitch is somewhat great, and
C: Pitch is great.

Example 1

1. Dehydration Step

A 20-liter autoclave (reactor) made of titanium was charged with 1,803 g of an aqueous sodium hydrosulfide (NaSH) solution [sulfur (S) content: 20.06 mol; analytical value of NaSH by a neutralization titration method: 59.42% by weight (19.11 mol); sodium sulfide ($Na_2S$) content: 0.95 mol] having an analytical value of 62.38% by weight as measured by iodimetry and 1,045 g of a 74.08% by weight aqueous sodium hydroxide (NaOH) solution (NaOH content: 19.35 mol) together with 6,702 g of N-methyl-2-pyrrolidone (hereinafter abbreviated as "NMP"). Assuming that a sulfur source composed of sodium hydrosulfide and sodium sulfide is indicated as "S", NaOH/NaSH before dehydration is 1.01 (mol/mol), and NaOH/S is 0.96 (mol/mol).

After purged with nitrogen gas, the contents were gradually heated to 200° C. over 2.5 hours with stirring to distill off 824.3 g of water and 829.7 g of NMP. At this time, 0.38 mol of hydrogen sulfide (H2S) was volatilized off. Accordingly, an available S content in the reactor after the dehydration step was 19.68 mol. The amount of H2S volatilized off corresponded to 1.91 mol % based on the charged S.

2. Charging Step

After the dehydration step, the reactor containing 19.68 mol of the available S was cooled to 170° C., 2,951 g [p-dichlorobenzene (hereinafter abbreviated as "pDCB")/available S=1.060 (mol/mol)] of pDCB, 2,000 g of NMP and 97 g [total water content in the reactor/available S=1.50 (mol/mol)] of water were added, and 7.44 g of NaOH having a purity of 97% was added in such a manner that (NaOH in the reactor/available S) is 1.060 (mol/mol). NaOH (0.76 mol) produced by volatilization of H2S is contained in the reactor.

3. Polymerization Step

While a stirrer installed in the reactor was operated at 250 rpm, a reaction was conducted at 220° C. for 1 hour, and the reaction mixture was then heated to 230° C. over 30 minutes to conduct the reaction at 230° C. for 1.5 hours (first-stage polymerization step). Thereafter, the number of revolutions of the stirrer was increased to 400 rpm, 461.0 g of water was charged under pressure into the reactor [total water content in the reactor/available S=2.80 (mol/mol)] while continuing the stirring, and the contents were heated to 260° C. to conduct a reaction for 5.0 hours (second-stage polymerization step).

4. Post Treatment Step

After completion of the reaction, 1,596.5 g of the reaction mixture cooled near to room temperature was sampled and sifted through a 100-mesh screen to collect a granular polymer. The thus-separated polymer was washed for 30 minutes with a mixed solution of 57.2 g of ion-exchanged water and 1,086.5 g of acetone in such a manner that the amount of a washing liquid is 5 times as much as the theoretical amount of the polymer collected. In this case, the water content in the washing liquid of the mixed solvent is 5% by weight.

After the above-described washing was performed twice, washing (washing time: 20 minutes) with 1,143.7 g of ion-exchanged water was conducted 3 times. Thereafter, this washed polymer was washed for 30 minutes with a 0.3% by weight aqueous 'acetic acid solution prepared by adding 3.43 g of acetic acid to 1,143.7 g of ion-exchanged water, and washed (washing time: 20 minutes) additional 4 times with 1,143.7 g of ion-exchanged water to obtain a washed polymer. Each washing was conducted with the temperature of the washing liquid controlled to room temperature. Filtration after the washing was conducted through a 100-mesh screen. The water content in a wet cake after filtration in each step was 40 to 60% by weight. This washed polymer was dried at 105° C. for 13 hours. The yield of the purified polymer thus obtained was 92%. The results are shown in Table 1.

Example 2

1. Dehydration Step

A 20-liter autoclave (reactor) made of titanium was charged with 1,951 g of an aqueous sodium hydrosulfide (NaSH) solution [sulfur (5) content: 22.08 mol; analytical value of NaSH by a neutralization titration method: 61.86% by weight (21.53 mol); sodium sulfide (Na2S) content: 0.55 mol] having an analytical value of 63.44% by weight as measured by iodimetry and 1,151 g of a 74.78% by weight aqueous sodium hydroxide (NaOH) solution (NaOH content: 21.53 mol) together with 6,701 g of NMP. Assuming that a sulfur source composed of sodium hydrosulfide and sodium sulfide is indicated as "S", NaOH/NaSH before dehydration is 1.00 (mol/mol), and NaOH/S is 0.97 (mol/mol).

After purged with nitrogen gas, the contents were gradually heated to 200° C. over 2.5 hours with stirring to distill off 852.8 g of water and 852.8 g of NMP. At this time, 0.40 mol of hydrogen sulfide (H2S) was volatilized off. Accordingly, an available S content in the reactor after the dehydration step was 21.68 mol. The amount of H2S volatilized off corresponded to 1.79 mol % based on the charged S.

2. Charging Step

After the dehydration step, the reactor containing 21.68 mol of the available S was cooled to 170° C., 3,347 g [pDCB/available S=1.050 (mol/mol)] of pDCB, 2,284 g of NMP and 114 g [total water content in the reactor/available S=1.50 (mol/mol)] of water were added, and 16.12 g of NaOH having a purity of 97% was added in such a manner that (NaOH in the reactor/available S) is 1.054 (mol/mol). NaOH (0.78 mol) produced by volatilization of H2S is contained in the reactor.

3. Polymerization Step

While a stirrer installed in the reactor was operated at 250 rpm, a reaction was conducted at 220° C. for 1 hour, and the reaction mixture was then heated to 230° C. over 30 minutes to conduct the reaction at 230° C. for 1.5 hours (first-stage polymerization step). Thereafter, the number of revolutions of the stirrer was increased to 400 rpm, 441.5 g of water was charged under pressure into the reactor [total water content in the reactor/available S 2.63 (mol/mol)] while continuing the stirring, and the contents were heated to 255° C. to conduct a reaction for 4.0 hours (second-stage polymerization step).

4. Post Treatment Step

The thus-obtained polymer was washed and dried in the same manner as in Example 1 except that the water content in the mixed solvent of water/acetone upon the washing was changed to 3% by weight. The yield of the purified polymer thus obtained was 92%. The results are shown in Table 1.

Example 3

1. Dehydration Step

A 20-liter autoclave (reactor) made of titanium was charged with 1,801 g of an aqueous sodium hydrosulfide (NaSH) solution [sulfur (S) content: 19.96 mol; analytical value of NaSH by a neutralization titration method: 59.5% by weight (19.12 mol); sodium sulfide (Na2S) content: 0.84 mol] having an analytical value of 62.12% as measured by iodimetry and 1,032 g of a 73.95% by weight aqueous sodium hydroxide (NaOH) solution (NaOH content: 19.08 mol) together with 6,009 g of NMP. Assuming that a sulfur source composed of sodium hydrosulfide and sodium sulfide is indicated as "S", NaOH/NaSH before dehydration is 1.00 (mol/mal), and NaOH/S is 0.96 (mol/mol).

After purged with nitrogen gas, the contents were gradually heated to 200° C. over 2.5 hours with stirring to distill off 831.2 g of water and 791.7 g of NMP. At this time, 0.39 mol of hydrogen sulfide (H2S) was volatilized off. Accordingly, an available S content in the reactor after the dehydration step was 19.57 mol. The amount of $H_2S$ volatilized off corresponded to 1.97 mol % based on the charged S.

2. Charging Step

After the dehydration step, the reactor containing 19.57 mol of the available S was cooled to 170° C., 2,920 g [pDCB/available S=1.015 (mol/mol)] of pDCB, 3,589 g of NMP and 167 g [total water content in the reactor/available S=1.70 (mol/mol)] of water were added, and 17.1 g of NaOH having a purity of 97% was added in such a manner that (NaOH in the reactor/available 5) is 1.060 (mol/mol). NaOH (0.79 mol) produced by volatilization of H2S is contained in the reactor.

3. Polymerization Step

While a stirrer installed in the reactor was operated at 250 rpm, a reaction was conducted at 220° C. for 4.5 hours (first-stage polymerization step). Thereafter, the number of revolutions of the stirrer was increased to 400 rpm, 606.4 g of water was charged under pressure into the reactor [total water content in the reactor/available S=3.42 (mol/mol)] while continuing the stirring, and the contents were heated to 255° C. to conduct a reaction for 3.0 hours (second-stage polymerization step).

4. Post Treatment Step

The thus-obtained polymer was washed and dried in the same manner as in Example 1. The yield of the purified polymer thus obtained was 89%. The results are shown in Table 1.

Example 4

The dehydration step to the polymerization step were performed in exactly the same manner as in Example 1. After completion of the reaction, the thus-obtained polymer was washed and dried in the same manner as in Example 1 except that the water content in the mixed solvent of water/acetone upon the washing was changed to 20% by weight. The results are shown in Table 1.

Comparative Example 1

The dehydration step to the polymerization step were performed in exactly the same manner as in Example 1. After completion of the reaction, the thus-obtained polymer was washed and dried in the same manner as in Example 1 except that the washing with the organic solvent was changed to washing with acetone (water content: at most 1% by weight) of a 100% reagent. The results are shown in Table 1.

Comparative Example 2

The dehydration step to the polymerization step were performed in exactly the same manner as in Example 2. After completion of the reaction, the thus-obtained polymer was washed and dried in the same manner as in Comparative Example 1. The results are shown in Table 1.

Comparative Example 3

The dehydration step to the polymerization step were performed in exactly the same manner as in Example 2. After completion of the reaction, 1,611 g of the reaction mixture cooled near to room temperature was sampled and sifted through a 100-mesh screen to collect a granular polymer. The thus-separated polymer was washed (washing time: 20 minutes) 5 times with 1,151.4 g of ion-exchanged water in such a manner that the amount of a washing liquid is 5 times as much as the theoretical amount of the polymer collected. Thereafter, this washed polymer was washed for 30 minutes with a 0.3% by weight aqueous acetic acid solution prepared by adding 3.45 g of acetic acid to 1,151.4 g of ion-exchanged water, and washed (washing time: 20 minutes) additional 4 times with 1,151.4 g of ion-exchanged water to obtain a washed polymer. Each washing was conducted with the temperature of the washing liquid controlled to room temperature. Filtration after the washing was conducted through a 100-mesh screen. The water content in a wet cake after filtration in each step was 40 to 60% by weight. This washed polymer was dried at 105° C. for 13 hours. The results are shown in Table 1.

TABLE 1

| | Example | | | | Comparative Example | | |
|---|---|---|---|---|---|---|---|
| | 1 | 2 | 3 | 4 | 1 | 2 | 3 |
| Washing Liquid Water/(Water + Acetone) (% by weight) | 5 | 3 | 5 | 20 | 0 | 0 | 100 |
| Melt viscosity (Pa s) | 126 | 29 | 250 | 120 | 133 | 31 | 28 |
| Amount of extract by Soxhlet extraction (amount of low-molecular weight component) (% by weight) | 2.2 | 2.6 | 2.0 | 2.5 | 2.0 | 2.7 | 3.6 |
| Content of nitrogen derived from impurities (ppm) | 15 | 22 | 13 | 4 | 111 | 125 | 120 |
| Gas generated (amount of pitch adhered) | A | A | A | A | B | B | C |

(Note)
(1) Content of nitrogen derived from impurities: a reduced value to the polymer.
(2) Gas generated (amount of pitch adhered): A - small, B = somewhat great, C = great.

As apparent from the results shown in Table 1, it is understood that in the PASs (Examples 1 to 4) according to the present invention, the content of the low-molecular weight component as determined by the Soxhlet extraction is at the same level as or somewhat higher than the PASs of Comparative Examples 1 and 2 obtained by washing the organic solvent, but the content of nitrogen derived from impurities is markedly reduced. As a result, the PASs according to the present invention are markedly inhibited from volatilization of impurities composed of a nitrogen-containing compound or adhesion to molding or forming apparatus thereof, which is caused by the impurities.

INDUSTRIAL APPLICABILITY

The PASs according to the present invention can be molded or formed into various injection-molded products or extruded products such as sheets, films, fibers and pipes either singly or by incorporating various kinds of inorganic fillers, fibrous fillers and/or various kinds of synthetic resins, if desired, as they are or after subjected to oxidative crosslinking.

What is claimed is:

1. A poly(arylene sulfide) obtained by polymerizing a sulfur source and a dihalo-aromatic compound in the presence of an alkali metal hydroxide in an organic amide solvent and washing the polymerized poly(arylene sulfide) resulting from the polymerization with a hydrophilic organic solvent containing water in a proportion of 1 to 20% by weight, wherein
   (i) the content of nitrogen contained in an extract from the washed poly(arylene sulfide) extracted by a mixed solvent containing 40% by weight of acetonitrile and 60% by weight of water is at most 50 ppm on the basis of the weight of the washed poly(arylene sulfide),
   (ii) the content of a low-molecular weight component extracted by Soxhlet extraction with chloroform from the washed poly(arylene sulfide) is at most 3.0% by weight, and
   (iii) the melt viscosity of the washed poly(arylene sulfide) is 1 to 3,000 Pa·s as measured at a temperature of 310° C. and a shear rate of 1,216 sec$^{-1}$.

2. The poly(arylene sulfide) according to claim 1, wherein the content of nitrogen contained in the extract from the washed poly(arylene sulfide) extracted by the mixed solvent containing 40% by weight of acetonitrile and 60% by weight of water is at most 25 ppm on the basis of the weight of the washed poly(arylene sulfide).

3. The poly(arylene sulfide) according to claim 1, wherein the hydrophilic organic solvent comprises a ketone, nitrile, organic amide, alcohol, or any combination thereof.

4. The poly(arylene sulfide) according to claim 1, wherein the hydrophilic organic solvent comprises acetone, acetonitrile, N-methyl-2-pyrrolidone, N,N-dimethylformamide, methyl alcohol, ethyl alcohol, propyl alcohol, or any combination thereof.

5. The poly(arylene sulfide) according to claim 1, obtained by polymerizing a sulfur source and a dihalo-aromatic compound in the presence of an alkali metal hydroxide in an organic amide solvent and washing the polymerized poly(arylene sulfide) resulting from the polymerization with acetone containing water in a proportion of 1 to 20% by weight.

* * * * *